(12) United States Patent
Hughes

(10) Patent No.: US 6,878,285 B2
(45) Date of Patent: Apr. 12, 2005

(54) ION-EXCHANGE BASED FLUID TREATMENT SYSTEMS

(75) Inventor: Kenneth D. Hughes, Alpharetta, GA (US)

(73) Assignee: Watervisions International, Inc., Cumming, GA (US)

( * ) Notice: Subject to any disclaimer, the term of this patent is extended or adjusted under 35 U.S.C. 154(b) by 137 days.

(21) Appl. No.: 10/125,074

(22) Filed: Apr. 17, 2002

(65) Prior Publication Data

US 2003/0196959 A1 Oct. 23, 2003

(51) Int. Cl.[7] .............................. C02F 9/00; C02F 1/42
(52) U.S. Cl. ...................... 210/663; 210/669; 210/670; 210/677; 210/681
(58) Field of Search ................................ 210/663, 669, 210/670, 677, 668, 681, 688

(56) References Cited

U.S. PATENT DOCUMENTS

| 4,182,676 | A | * | 1/1980 | Casolo ........................ 210/669 |
| 4,198,296 | A | | 4/1980 | Doumas et al. |
| 5,180,491 | A | * | 1/1993 | Polasky ...................... 210/282 |
| 6,187,192 | B1 | | 2/2001 | Johnston et al. |
| 6,197,193 | B1 | * | 3/2001 | Archer ........................ 210/266 |

* cited by examiner

Primary Examiner—Robert A. Hopkins
(74) Attorney, Agent, or Firm—Kilpatrick Stockton LLP

(57) ABSTRACT

A process for removing soluble and insoluble inorganic, organic, and microbiological contaminants from a fluid stream employing a pretreatment module, a post-treatment module, a recharge stream module or any combination thereof, and an ion exchange module, is provided. The process provided reduces the problems associated with ion exchange material fouling and increases contaminant removal capacity.

62 Claims, 2 Drawing Sheets

ION-EXCHANGE BASED FLUID TREATMENT SYSTEMS

BACKGROUND OF THE INVENTION

1. Field of the Invention

This invention relates generally to a process for removing inorganic, organic, and microbiological contaminants from fluids. In its more particular aspects, the invention relates to the field of such devices that use ion exchange resins as one stage of a fluid treatment process. More particularly, a process for removing soluble and insoluble inorganic, organic, and microbiological contaminants from a fluid stream employing a pretreatment module, a post-treatment module, a recharging solution treatment module, and an ion exchange resin module, is provided. The process provided reduces the problems associated with ion-exchange resin fouling and increases contaminant removal capacity.

2. Description of Related Art

Purification of Water

Purification or filtration of water or other aqueous solutions is necessary for many applications, from the provision of safe or potable drinking water to biotechnology applications including fermentation processing and separation of components from biological fluids, and to industrial processes that require waste stream treatment and recovery of process chemicals. Similarly, the removal of contaminants from fluids used in medical procedures and semiconductor fabrication processes, where ultrapurified fluids are required, and in environments where the fluids will be recirculated, such as aircraft or spacecraft, is also an important application for filtration and fluid treatment materials. In recent years, the need for water filtration and purification in the home has become more recognized, and the competing concerns of energy efficiency and residential fluid quality have lead to numerous filtration products, that purport to remove small particles, allergens, microorganisms, intentionally introduced biotoxins, pesticides, and toxic metals such as lead, mercury, and arsenic.

There are many well-known methods currently used for water purification, such as reverse osmosis, distillation, ion-exchange, chemical adsorption, coagulation, and filtering or retention. Particle filtration may be completed through the use of membranes or layers of granular materials. Other fluid purification techniques involve chemical introduction which alters the state or chemical identity of the contaminant. Examples of chemical additives include oxidizing agents, flocculating agents, and precipitation agents.

In many fluid purification applications a combination of techniques are required in order to completely purify fluids, such as water. Combinations of technologies may be implemented by combining functions in a single device or using several different devices and technologies in series where each performs a distinct function. Examples of this practice include the use of mixed ion-exchange resins that remove both negative and positively charged chemical species and oxidation/filtration methods where oxidizers are used to generate particulate matter that may be subsequently filtered.

The use of ion exchange materials, namely naturally occurring minerals and synthetic minerals and resins in fluid treatment operations has become wide spread in the field. Ion exchange systems are currently commercially available in small volume formats such as pitchers, in larger residential volume formats such as whole house water softeners which remove hardness ions, and in specialty water purification systems that must remove contaminants that pass through reverse osmosis membranes. Ion exchange resins are also used in many industrial applications to remove or isolate important chemical and biological compounds and to remove contaminants. Ion exchange resin systems can be scaled significantly to handle very large volume applications. In practical potable water applications the ion exchange material must be recharged and reused to be cost effective. Recharging may be conducted with salt and/or acidic or basic solutions.

Ion exchange materials are available in two formats; one format removes positively charged ions by using a negatively charged material surface and the other format removes negatively charged ions by using a positively charged material surface. The ion-exchange surface in both formats may be tuned to increase the strength of the ion interactions. Although it is possible to increase the specificity of the material surface for specific ions this is generally not the case in commonly used materials. As a result, ion exchange materials remove ions at levels related to the ion charge and the relative concentration of all charged species in solution.

It is well understood that ion exchange water treatment systems have serious limitations when compared to other treatment systems and that the technology does not meet the requirements of many applications. Some of these drawbacks include the fouling of the ion-exchange material surface with organics and microorganisms, the plugging of the housings holding the particulate material, cost effectiveness, the limited capacity for ion removal and thus the need to regenerate the material, and the inability to remove uncharged contaminants from fluid streams. As a result, many applications require the coupling of additional technology with ion-exchange systems including reverse osmosis and other membrane systems.

There is significant prior art in the field of water treatment systems employing ion exchange materials. Specifically, there is significant art associated with the manufacture of ion-exchange materials including resins and zeolites, pH adjustment of "raw" fluids through chemical injection before material contact, the cleaning and recharging of ion exchange systems, the back flushing of ion exchange systems, and the design of automated and semi-automated treatment systems employing many variations of these procedures. Unfortunately, these modifications to the basic concept of pressurizing fluid against the ion exchange material and collecting treated fluid from the low-pressure side of the ion exchange material system does not address the organic, inorganic, and microorganism fouling that occurs on the ion exchange surface or the ability to remove uncharged contaminants from the fluid stream.

Accordingly one object of this invention is to provide an ion exchange based water treatment system which employs inexpensive, safe, and reliable ion exchange pretreatment, post-treatment, and recharge solution fluid conditioning. The process of the invention also serves to protect the ion exchange material from, particulates, chemical and microbiological contaminants, and to improve the removal level of some contaminants, all of which are objects of the invention. As a result many water treatment systems comprised of ion-exchange materials will be more applicable for residential point-of-use, point-of-entry applications, and increasing many industries.

SUMMARY OF THE INVENTION

To this end, the present inventor has discovered that a significant problem in the treatment of fluids with ion exchange systems employed for the removal of soluble inorganic, and organic species from a fluid stream is that the ion exchange system must be protected from particulates, organic molecules and microorganisms. Furthermore the inventors have discovered that a significant problem in the employment of ion exchange technologies, methods, and processes is that some highly toxic contaminants are uncharged and are thus not removed by ion exchange materials. This situation significantly decreases the sites where ion-exchange technology can be applied.

In accordance with the invention the inventor has discovered that the use of inexpensive, safe, and operationally simple, pretreatment, post-treatment, and recharge stream treatment modules, can provide improved ion-exchange material life, can increase the removal levels of specific problem contaminants, and reduce the problems associated with microbiological surface fouling.

Furthermore, it has been discovered that the process of the invention can reduce simultaneously both chemical and microbiological contaminants to regulatory levels established by agencies such as the US EPA and the WHO.

With respect to the toxin arsenic it has been discovered that employing a single pretreatment module, ion exchange module, and a post-treatment module that the dissolved metal contaminant trivalent arsenic can be reduced to levels required by the US EPA and the WHO.

Further, the present inventor has discovered that composite materials containing inexpensive solids originating from natural sources or synthetic sources or a combination thereof are capable of serving as sole components of, pretreatment, post-treatment, and recharge stream treatment modules.

Additionally, it has been recognized that the improvements provided by the inventive process allow fluid treatment ion-exchange technology to be more widely applied, as example in residential settings.

This invention is in general a process for the purification and filtration of fluids, in particular aqueous fluids (such as drinking water or swimming or bathing water), or other aqueous solutions (such as fermentation broths, solutions used in cell culture, and in biotechnology applications), or in food and beverage applications. It may be used as a pretreatment in many industries including those which generate potable water, process semiconductor material, process industrial fluids, and which address environmental contamination. The process may be scaled easily.

The use of the process of the invention results in the removal of an extremely high percentage of contaminants, including trivalent arsenic species and water treatment chlorine compounds. In particular, the use of the device and method of the invention results in purification of water to a level that meets EPA, WHO, and NSF standards for designation as a water treatment device.

In one embodiment, the invention relates to a process employing a pretreatment module, a post-treatment module, a recharge stream treatment module, and an ion-exchange treatment module to create a water treatment system. Typically, the pretreatment, post-treatment, and recharge stream treatment module contains a composite material that provides particulate reduction, chemical oxidizer reduction, chemical contaminant modification, and microbiological organism and component reduction. The composite material used can be any one of the composites described by Water Visions International Inc. patents including that which is described in U.S. patent application Ser. No. 06/187,192. Additionally it may include composites generated from fluid treatment carbon, metal phosphates, metal oxides, reduced metals, silicates, metal sulfates, metal carbonates, silicates, metal hydroxides, or combinations thereof. Even furthermore it may include composites prepared from fluid treatment carbon, metal phosphates, metal oxides, reduced metals, silicates, metal sulfates, metal carbonates, silicates, metal hydroxides, or combinations thereof in the form of a porous block as the result of the presence of a binder.

In another embodiment, the invention relates to a process comprised of using, a pretreatment module, a post-treatment module, and an ion exchange module to create a water treatment system. Typically, the pretreatment and post-treatment modules contain a composite material that provides particulate reduction, chemical oxidizer reduction, chemical contaminant modification, and microbiological organism and component reduction. The composite material used can be any one of the composites described by Water Visions International Inc. patents including that which is described in U.S. patent application Ser. No. 06/187,192. Additionally it may include composites generated from fluid treatment carbon, metal phosphates, metal oxides, reduced metals, silicates, metal sulfates, metal carbonates, silicates, metal hydroxides, or combinations thereof. Even furthermore it may include composites prepared from fluid treatment carbon, metal phosphates, metal oxides, reduced metals, silicates, metal sulfates, metal carbonates, silicates, metal hydroxides, or combinations thereof in the form of a porous block as the result of the presence of a binder.

In another embodiment, the invention relates to a process comprised of using, a pretreatment module, and an ion exchange module to create a water treatment system. Typically, the pretreatment module contains a composite material that provides particulate reduction, chemical oxidizer reduction, chemical contaminant modification, and microbiological organism and component reduction. The composite material used can be any one of the composites described by Water Visions International Inc. patents including that which is described in U.S. patent application Ser. No. 06/187,192. Additionally it may include composites generated from fluid treatment carbon, metal phosphates, metal oxides, reduced metals, silicates, metal sulfates, metal carbonates, silicates, metal hydroxides, or combinations thereof. Even furthermore it may include composites prepared from fluid treatment carbon, metal phosphates, metal oxides, reduced metals, silicates, metal sulfates, metal carbonates, silicates, metal hydroxides, or combinations thereof in the form of a porous block as the result of the presence of a binder.

In another embodiment, the composite contained in the pretreatment module, post-treatment module, or recharge stream treatment module, and any combination thereof also contains material filter wraps with porosities that are greater than that provided by the composite material. Typically, these are natural or synthetic materials including but not limited to cotton and polyethylene respectively.

In another embodiment, the pretreatment module, post-treatment module, or recharge stream treatment module, and any combination thereof are present in units greater than one and arranged in a series or parallel flow configuration.

In another embodiment, the pretreatment module, post-treatment module, or recharge stream treatment modules, and any combination thereof are used with multiple ion-exchange units.

In another embodiment, the post-treatment module is located after a storage tank, bladder or other fluid depository and before the end use application.

The process of the invention relates to filtering fluids, such as water, aqueous solutions, to convert/reduce a large proportion of one or more types of chemical species contained therein, by contacting the fluid with the treatment modules of the process.

In a particular aspect of this embodiment of the invention, this contacting occurs within the module which is typically a standard housing which efficiently contains the fluid treatment materials and eliminates fluid bypass around the fluid treatment material, with the unfiltered fluid flowing through an inlet, contacting the purification material in one or more chambers, and the filtered fluid flowing out of the chamber through an outlet.

The purification material of the invention can be used to purify drinking water, to purify water used for recreational purposes, such as in swimming pools, hot tubs, and spas, to purify process water, e.g. water used in cooling towers, to purify aqueous solutions, including but not limited to, fermentation broths and cell culture solutions (e.g., for solution recycling in fermentation or other biotechnology processes) and aqueous fluids used in surgical procedures for recycle or reuse.

The process of the invention has the additional advantage of making use of readily available mineral materials, including those obtained from natural sources, for inclusion in the treatment modules.

In yet another embodiment of the invention, the material of the invention, namely minerals and optionally other adsorptive and buffering materials in a binder matrix and formed into a block or sheet, can be used as a medium for converting chemical species used in biotechnology applications such as fermentation processes and cell culture and in semiconductor operations. In this embodiment, biological process fluids, such as nutrient broths, substrate solutions, and the like, are passed through the treatment material of the invention in a manner that allows the fluids to come into contact with the chemical species immobilized therein, and effluent removed from the material and further processed as needed.

DETAILED DESCRIPTION OF THE INVENTION

Figure 1:
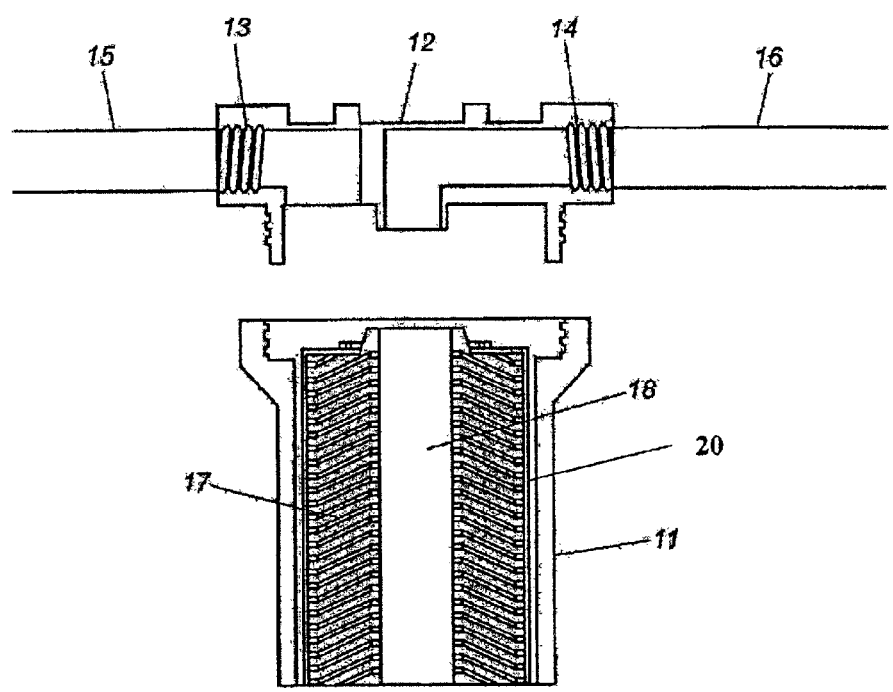
FIG. 1 is an illustration noting some of the components of the inventive process.

As indicated above, one embodiment of the invention relates to a process comprised of using, a pretreatment module, a post-treatment module, and an ion exchange module to create a water treatment system. Typically, the pretreatment, post-treatment, and ion exchange modules are housings with a fluid inlet and an outlet, which contains a composite material that provides particulate reduction, chemical oxidizer reduction, chemical contaminant modification, and microbiological organism and component reduction.

A more preferred embodiment of the invention relates to a pretreatment module, and a post-treatment module containing a composite material in the form of a block filter and wrapped with filter sheet material with a larger pore size containing fluid treatment carbon, metal phosphates, metal oxides, reduced metals, silicates, metal sulfates, metal carbonates, silicates, metal hydroxides, or combinations thereof in a binder, which is typically a polymeric material. In a particular aspect of this embodiment, the invention relates to a block filter that contains a mixture of granulated phosphate minerals, silicates, iron in oxide, hydroxide, or reduced metal form or a combination thereof and granulated activated charcoal (GAC) or bone charcoal or other adsorptive filter media in a binder material, such as a thermoplastic of fluid swellable material, such that the mineral derivatives and GAC and/or bone charcoal are fixed within the binder matrix, and that channeling from flow during water treatment cannot occur.

In another particular aspect of this embodiment, the invention relates to a rigid block filter that contains a mixture of silicate minerals and aluminum oxides, titanium oxides, iron oxides, and granulated activated charcoal (GAC) or bone charcoal, bauxite, or other adsorptive filter media in a binder material, such as a thermoplastic material or fluid swelling material, such that the silicate and aluminum, iron and titanium containing minerals and derivatives and GAC and/or bone charcoal are fixed within the binder matrix, and that channeling from flow during water treatment cannot occur.

The pore size of the composites materials used in the pretreatment module, a post-treatment module, and recycle stream treatment module influences flow rates of the fluid through the module, and is a function of the size of the granular particles and in the case of block composites additionally the amount of binder present. As used herein, the term "block" does not denote any particular geometrical shape, but rather that the material is not a sheet or membrane. Nonlimiting examples of "blocks" as this term is intended to be used include tubes, annular rings, as well as more conventional geometrical solids. Material formed into flexible blocks is particularly suitable for use in pipes or tubes that serve as the filter medium contained in the pretreatment module, post-treatment module, or recharge stream treatment module.

One of the desirable features of the process of the invention is that the pretreatment module, post-treatment module, and recharge stream treatment module may be formed into any desired shape, and thus provides ease of handling and use. Additionally, multiple units of treatment modules may be used. Additionally, pretreatment module, post-treatment module, and recharge stream treatment module may easily use composite materials in the form of sheets.

Those familiar with the art of fluid filtration will understand that the pore size and physical dimensions of the treatment materials contained in the pretreatment module, post-treatment module, or recycle stream treatment module may be manipulated for different applications and that variations in these variables will alter flow rates, back-pressure, and the level of chemical and microbiological contaminant removal. Likewise those knowledgeable in the art will recognize that variations in the percentages of each component of the purification material will provide some variability in utility. For example, increasing the percentage of carbon in the filtration material contained in the pretreatment module, post-treatment module, and/or recycle stream treatment module will result in a module having an increased capacity for chlorine removal, while increasing the amount of zeolite or softening agent will increase the removal of divalent and trivalent hardness ions.

In one particular embodiment of the invention, the complex composite used in the pretreatment module, post-treatment module, and recharge stream treatment module is derived from the processing of animal bones (bone charcoal) and the processing of natural materials to generate a GAC material. The bone charcoal, which is a complex mixture after processing of phosphates, sulfates, carbonates, silicates, and reduced metals and the GAC are present in approximately equal amounts, with the percentage of binder material kept to a minimum. However, the mineral mixture used in the invention may be generated or obtained from other natural or synthetic/industrial sources and mixtures of the different derivatives can provide differences in the properties of the purification material. For example, adding calcium carbonate to the module can decrease the acid concentration in the effluent water if water is used as the fluid. This can be useful in, e.g. neutralizing acidic water in such a way as to maintain desirable water pH levels therein. The carbonate species in the filter material may be obtained either by inclusion of alkali and alkaline earth salts or metal based salts such as those containing titanium, manganese and iron, inclusion of other carbonate salts and compounds, or by pre-conditioning the purification material by passing reactive carbonate-containing solutions therethrough.

Those experienced in the art will also understand that many different pH injection, cleaning agent injections, and back-flushing operations may be used in addition to the pretreatment module, post-treatment module, and recharge stream treatment module. Furthermore, those experienced in the art will also understand that many of these processes employed in addition to the pretreatment module, post-treatment module, and recharge stream treatment module may be automated or semi-automated.

Furthermore, those experienced in the art will also understand that many different ion exchange materials may be used in the ion exchange module and that the actual ion exchange material in the ion exchange module is not in itself an object of the invention. Ion exchange materials can include any natural or synthetic material, treated or untreated which provides a separation function for soluble components of fluid streams.

Even furthermore, those experienced in the art will also understand that various pumps with varying output volumes and pressures, distribution conduits, valves, sampling ports, and other plumbing fixtures and components are useful in the operation of ion exchange containing water treatment systems and that use and arrangement of these components does not provide any significant deviation from the spirit of the inventive process.

In another embodiment of the invention, the pretreatment module, a post-treatment module, and recharge stream treatment module are constructed to withstand sterilization. Sterilization processes include thermal processes, such as steam sterilization or other processes wherein the purification material is exposed to elevated temperatures or pressures or both, resistive heating, radiation sterilization wherein the pretreatment module, a post-treatment module, or recharge stream treatment module is exposed to elevated radiation levels, including processes using ultraviolet, infrared, microwave, and ionizing radiation, and chemical sterilization, wherein the purification material is exposed to elevated levels of oxidants or reductants or other chemical species, and which is performed with chemicals such as halogens, reactive oxygen species, formaldehyde, surfactants, metals and gases such as ethylene oxide, methyl bromide, beta-propiolactone, and propylene oxide.

Additionally, sterilization may be accomplished with electrochemical methods by direct oxidation or reduction with microbiological components or indirectly through the electrochemical generation of oxidative or reductive chemical species. Combinations of these processes are also used on a routine basis. It should also be understood that sterilization processes may be used on a continuous or sporadic basis while the purification material is in use.

In general, the invention comprises a process for fluid treatment, in particular an aqueous solution or water, to remove organic and inorganic elements and compounds present in the water as particulate or soluble entities. In particular, the process can be used to remove chemical and microbiological contaminants, including heavy metals such as arsenic, bacteria, and viruses and components thereof, from water or other fluids destined for consumption or other use by humans or other animals. The process of the invention is particularly useful in these applications where the reduction in concentration of chemical and microbiological contaminants made possible by the invention meets WHO, EPA, and NSF standards for water purification devices.

With reference to the drawings, the process of the invention and a mode of operation will now be described with regard to one particular embodiment, which employs a pretreatment module, a post-treatment module, a recharge stream module and an ion-exchange module. FIG. 1 illustrates a typical specific embodiment of a water treatment system employing a pretreatment module 2, a post-treatment module 4, a recharge stream module 5, a recharge solution tank 6, and an ion exchange module 3. In this particular embodiment the pretreatment module, post-treatment module, and recharge stream module are single housings containing a single rigid porous block filter.

Figure 2:
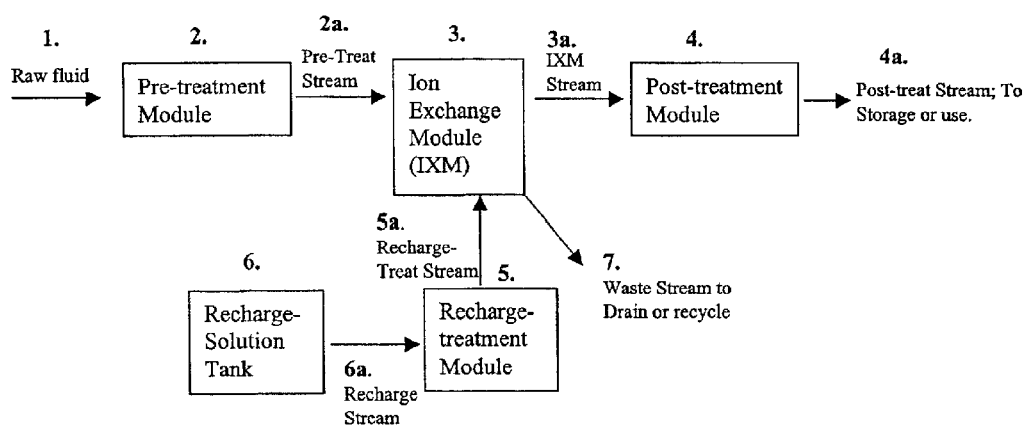
FIG. 2 is a schematic view of a fluid treatment material containing fluid treatment carbon, metal phosphates, metal oxides, reduced metals, metal silicates, metal sulfates, metal carbonates, and metal hydroxides or a combination thereof and a binder matrix in the form of a block which is wrapped in two different polyethylene membrane materials with porosities greater than the composite block, which is contained in a housing and is a component in a pretreatment module, a post treatment module, a recharge treatment module or a combination thereof.

FIG. 2 illustrates the construction of a treatment module. Specifically, a removable housing 11 is mated with a cap 12, the cap 12 having an inflow orifice 13 and an outflow orifice 14. A water supply conduit 15 is joined to the inflow orifice 13 to deliver non-treated water into the device, and a water discharge conduit 16 is joined to the outflow orifice 14 to conduct treated water from the device. Water passes into the housing 11. The pressure of the water flow forces it through the porous block filter 17 and filter sheets 20, which as shown is formed in the shape of hollow cylinder with an axial bore 18. The treated water then passes into the axial bore 18 which connects to the outflow orifice 14. FIG. 2 is provided as a representative illustration of one possible configuration. It is to be understood that other configurations where water is caused to pass through a porous filter block, a composite filter sheet, multiple blocks and/or sheets and combination thereof (which may have different geometrical shapes and/or different flow properties) are contemplated to be within the scope of the invention. The block filter 17 may be formed by any of a number of known methods, such as by extrusion, compression, molding, sintering, material swelling pressure or other techniques.

In the operation of the process, as illustrated in FIG. 1, a raw fluid stream 1, is passed into contact with the high pressure side of the pretreatment module 2. The fluid exiting the low pressure side of the pretreatment module is the pretreatment stream 2a. This pretreatment stream is a fluid with reduced particulate, chemical contaminant, and microorganism concentrations as a result of exposure to the pretreatment module. The pretreatment stream 2a is then stored for further processing or immediately passed into contact with the high pressure side of an ion exchange module 3. During exposure to the ion exchange module 3, an ion exchange stream (IXM) 3a, is generated and collected from the low pressure side of 3. Stream 3a has significantly reduced ion and contaminate levels than the influent fluid stream. The ion exchange stream, 3a (IXM) once collected from the low pressure side of the ion exchange module 3, is stored or immediately passed into contact with the high pressure side of the post-treatment module 4. The post treatment stream 4a may contain even more reduced levels of contaminants than the ion exchange stream 3a. This is contaminant specific. Recharging solutions as example salts, acids, bases, and/or chelation compounds stored in a storage tank, 6, may be passed into contact with the high pressure side of the recharge treatment module 5. Fluid collected from the low pressure side of the recharge treatment module 5, recharge treatment stream 5a, have reduced chemical and microbiological contaminant levels and maybe be used to recharge and/or back-flush membrane module 3 or used to back-flush pretreatment module 2 or post treatment module 4. After back-flushing, waste fluid streams may be sent directly to drain 7. Likewise any of the fluids stored such as 2a, 3a, or 4a may be used to back flush any of the treatment modules. In practice fluid streams with reduced levels of contaminants are often used for back-flushing. Raw fluid 1, may be a fluid that has undergone a prior treatment stage. Furthermore it should be understood that the dosing of chemicals at any stage of the operation, as example between the pretreatment and ion exchange modules and between recharge treatment and ion exchange modules is possible and anticipated.

EXAMPLE 1

Raw water with the following composition, arsenic(III) 0.058 mg/L; calcium 40 mg/L; fluoride 1 mg/L; magnesium 12 mg/L; nitrate 2 mg/L; pH=8.5; sulfate 50 mg/L; and phosphorus 0.04 mg/L. was used to demonstrate the effectiveness of the inventive process.

As noted in FIG. 1, a preferred embodiment of the inventive process involves the use of a pretreatment module, an ion exchange module, and a post-treatment module. Both the pretreatment module and post-treatment module house a cylindrical filter block (17) which may be prepared with a material composition of approximately 42.5% bone charcoal obtained from Brimac Carbon Industries, approximately 42.5% GAC obtained from KX Industries, and approximately 15% thermoplastic binder material. This bone charcoal includes a mineral mixture that contains varying amounts of metal phosphates including iron, metal silicates, metal sulfates including calcium, metal carbonates including calcium, metal hydroxides, or combinations thereof.

The material may then be extruded at a temperature that provides a uniform mixture of bone charcoal, GAC, and thermoplastic binder. The cylindrical or toroidally shaped block (17) is approximately 9.8 inches in length, with an outer diameter of approximately 2.5 inches and an inner diameter the bore (18) of approximately 1.25 inches. This shape filter fits into a standard water filtration housing used in the home and industrial settings. The filter material has a resistance of about 300Ω.

In this example a single filter material block and housing serves as a pretreatment module. Likewise, a single filter material block and housing serves as a post-treatment module. The pretreatment module was tested for particulate reduction and reduced particles micron and larger by more than 95%.

The ion exchange module plumbed between the pretreatment module and post treatment module is manufactured by Hydrosystems Inc. (CT) and is commercially available. The mixed ion exchange resin contained in this module is constructed from a synthetic polymer and has a grain capacity of XX.

This process described in this example, namely a pretreatment module, ion exchange module, and post-treatment module reduced trivalent arsenic concentrations greater than 90% for over 125 gallons of operation. For comparison a similar water treatment system containing similar ion exchange material but a pretreatment activated carbon filter and a post-treatment activated carbon filter provided a much lower capacity to reduce the concentration of trivalent arsenic.

As described above, the process of the invention is extremely useful in the area of water purification, particularly the area of drinking water purification. In addition to functioning as a purifier for drinking water, the material of the invention can also be used to treat fluids used for food processing purposes and industrial wastewater stream processing such as water used in hydrocarbon processing and semiconductor processing. As the result of the ability of the invention to efficiently react with chemical species such as trivalent arsenic and chlorine in aqueous solutions, it has numerous applications in the pharmaceutical and medical fields. For example, the material of the invention can be used in the preparation of pharmaceuticals and to purify fluids that contact physiological fluids such as blood.

The material can also be used in industrial fields where treatment of fluids that result from mining activities is required.

The process of the invention has numerous other industrial uses, e.g., treating water used in cooling systems. Cooling water often passes through towers, ponds, or other process equipment where heavy metals are leached into the fluid stream as a result of metal component contact with the fluid. By reducing the concentration of heavy metals, the present invention helps to reduce the health hazard associated with the cooling fluids and the cost and dangers associated with chemical treatment programs, and reduces the cost of waste disposal or liquid discharges.

In each of these applications, the method of the invention is relatively simple and should be apparent to those of skill in the fluid treatment art. The fluid to be filtered is simply conducted to one side of pretreatment module or post-treatment module of the invention, typically disposed in some form of housing, and forced through the modules as the result of a pressure drop across the composite materials. Purified, filtered fluid is then conducted away from the "clean" side of the filter and further processed by the ion exchange module or used.

The invention having been thus described by reference to certain of its specific embodiments, it will be apparent to those of skill in the art that many variations and modifications of these embodiments may be made within the spirit of the invention, which are intended to come within the scope of the appended claims and equivalents thereto.

What is claimed is:

1. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the treatment module a treated stream; and passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the treatment module is a pretreatment module and the fluid stream passes through the pretreatment module and is then passed through the ion exchange module and further comprising a post-treatment module wherein the treated ion exchange stream is passed into contact with a high pressure side of the post-treatment module to reduce soluble contaminants which pass through the ion exchange module, and to recover from the low pressure side of the post-treatment module a post-treatment stream which may be used and wherein a portion of said post-treatment stream is recycled to the high pressure side of either the pre-treatment module or the ion exchange module.

2. The process of claim 1, wherein the portion of said post-treatment stream is recycled to the high pressure side of the pre-treatment module.

3. The process of claim 1, wherein the portion of said post-treatment stream is recycled to the high pressure side of the ion exchange module.

4. The process of claim 1, further comprising the step of passing a recharge solution stream into contact with a high pressure side of a recharge module to recover from the low pressure side a treated recharge stream; further wherein the treated recharge stream is passed into contact with a high pressure side of a treatment module to back-flush the treatment module to reduce the concentration of both soluble and insoluble contaminants including metals and microbiological contaminants therein, wherein the treatment module may be a pretreatment module, a post-treatment module; the ion exchange module, or a combination thereof.

5. The process of claim 1, where the contaminant removed is a metal.

6. The process of claim 5, where the metal is arsenic.

7. The process of claim 6, where the arsenic metal is in a trivalent state.

8. The process of claim 6, where the arsenic metal is in a pentavalent state.

9. The process of claim 5, where the metal is iron.

10. The process of claim 9, where the iron metal is in the divalent state.

11. The process of claim 5, where the metal is cadmium.

12. The process of claim 1, where the contaminant removed is an oxidizer.

13. The process of claim 12, where the contaminant removed is a chlorine containing oxidizer.

14. The process of claim 12, where the contaminant removed is a manganese containing oxidizer.

15. The process of claim 12, where the contaminant removed is a peroxide containing oxidizer.

16. The process of claim 1, where the contaminant reduced is a sulfur containing compound.

17. The process of claim 16, where the contaminant reduced is hydrogen sulfide.

18. The process of claim 1, where the contaminant reduced is a microorganism such as bacteria, virus, cyst, or a combination thereof.

19. The process of claim 1, where the contaminant reduced is a biological component of a microorganism such as bacteria, virus, cyst, or a combination thereof.

20. The process of claim 1, where the contaminant reduced is a hydrocarbon.

21. The process of claim 20, where the contaminant reduced is a hydrocarbon from a petroleum-related waste stream.

22. The process of claim 1, wherein the fluid undergoes pH adjustment before the treatment module.

23. The process of claim 1, wherein the fluid undergoes pH adjustment between the treatment module and the ion exchange module.

24. The process of claim 4, wherein the fluid undergoes pH adjustment between the recharge module and the ion exchange module.

25. The process of claim 4, wherein the fluid undergoes pH adjustment between the recharge module and the treatment module.

26. The process of claim 1, where at least one turbidity reduction filter is used prior to the treatment module.

27. The process of claim 1, where the ion exchange material comprises an anion exchange material.

28. The process of claim 1, where the ion exchange material comprises a cation exchange material.

29. The process of claim 1, where the ion exchange material comprises a mixture of both anion and cation exchange materials.

30. The process of claim 1, further comprising at least one additional ion exchange module, wherein the ion exchange modules are arranged in series.

31. The process of claim 1, further comprising at least one additional ion exchange module, wherein the ion exchange modules are arranged in parallel.

32. The process of claim 1, where an ion exchange cleaning or recharging solution is employed.

33. The process of claim 1, wherein the treatment module contains bauxite or components of bauxite.

34. The process of claim 33, wherein the treatment module contains aluminum oxides.

35. The process of claim 33, wherein the treatment module contains oxides of iron, titanium, and silicon.

36. The process of claim 33, wherein the treatment module contains aluminosilicates and zeolites.

37. The process of claim 30, wherein the treatment module contains bone charcoal.

38. The process of claim 37, wherein the treatment module contains one or more of the individual components contained in bone charcoal.

39. The process of claim 38, wherein the treatment module contains calcium phosphates.

40. The process of claim 39, wherein the treatment module contains calcium phosphate in an apatite structure.

41. The process of claim 37, wherein the treatment module contains calcium carbonates.

42. The process of claim 1, wherein the treatment module contains one or more of the individual components contained in phosphate rock.

43. The process of claim 1, wherein the treatment module contains manganese containing silicates.

44. The process of claim 1, wherein the treatment module contains iron phosphates, iron carbonates, iron silicates or combinations thereof.

45. The process of claim 1, wherein the treatment module contains zirconium phosphates.

46. The process of claim 1, wherein the treatment module contains activated carbon.

47. The process of claim 1, wherein the treatment module contains copper metal or an alloy of copper metal.

48. The process of claim 1, wherein the treatment module contains iron metal or an alloy of iron metal.

49. The process of claim 1, wherein the treatment module contains a prefilter sheet material.

50. The process of claim 49, where the prefilter sheet material contains a pore size distribution greater than that contained by the composite material.

51. The process of claim 49, where the prefilter sheet material contains a pore size distribution smaller than that contained by the composite material.

52. The process of claim 1, where the treatment module, the ion exchange module, or a combination thereof is back-flushed to extend life using a reservoir or fluid stream originating from the low-pressure side of the treatment module, the ion exchange module, or the combination thereof.

53. The process of claim 1, further comprising sterilizing the treatment module.

54. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a module containing a composite material to reduce both soluble and insoluble contaminants and to convert soluble contaminants into other forms present therein, and to recover from the low pressure side of the module a treated stream;

passing the fluid stream from the low pressure side of the module into contact with a high pressure side of an ion exchange module containing ion exchange material to remove additional insoluble and soluble chemical and microbiological contaminants present therein, and to recover from the low pressure side a treated ion exchange stream; and passing a recharge solution stream into contact with a high pressure side of a recharge module to recover from the low pressure side a treated recharge stream, and the treated recharge stream is passed into contact with a high pressure side of a treatment module to back-flush the treatment module to reduce the concentration of both soluble and insoluble contaminants including metals and microbiological contaminants therein, wherein the treatment module may be a pretreatment module, a post-treatment module, the ion exchange module, or a combination thereof.

55. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a module containing a composite material to reduce both soluble and insoluble contaminants and to convert soluble contaminants into other forms present therein, and to recover from the low pressure side of the module a treated stream; and passing the fluid stream from the low pressure side of the module into contact with a high pressure side of an ion exchange module containing ion exchange material to remove additional insoluble and soluble chemical and microbiological contaminants present therein, and to recover from the low pressure side a treated ion exchange stream, wherein the treatment module contains iron metal or an alloy of iron metal.

56. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream; and passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment either before the treatment module or between the treatment module and the ion exchange module.

57. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream; and passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment before the treatment module, where the ion exchange material comprises a mixture of both anion and cation exchange materials.

58. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream;

passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment before the treatment module; and at least one additional ion exchange module, wherein the ion exchange modules are arranged in parallel.

59. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream;

passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment before the treatment module; and wherein the treatment module contains bauxite, components of bauxite or aluminum oxides.

60. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream;

passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment before the treatment module; and wherein the treatment module contains bone charcoal.

61. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream;

passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment before the treatment module; and wherein the treatment module contains zirconium phosphates.

62. A process for treating a fluid stream containing soluble and insoluble inorganic and organic chemical contaminants, microbiological contaminants, or combinations thereof to reduce the concentration of these contaminants comprising:

passing the fluid stream into contact with a high pressure side of a treatment module containing a composite material to reduce both soluble and insoluble contaminants and to convert soluble contaminants into other forms present therein, and to recover from the low pressure side of the module a treated stream;

passing the fluid stream from the low pressure side of the treatment module into contact with a high pressure side of an ion exchange module containing ion exchange material to remove additional insoluble and soluble chemical and microbiological contaminants present therein, and to recover from the low pressure side a treated ion exchange stream, wherein the fluid undergoes pH adjustment before the treatment module; and where the treatment module, the ion exchange module, or a combination thereof is back-flushed to extend life using a reservoir or fluid stream originating from the low-pressure side of the treatment module, the ion exchange module, or the combination thereof.

* * * * *